May 29, 1928.
F. R. FURBISH
1,671,187
FILTER PRESS CLOTH
Filed Nov. 13, 1925 3 Sheets-Sheet 1
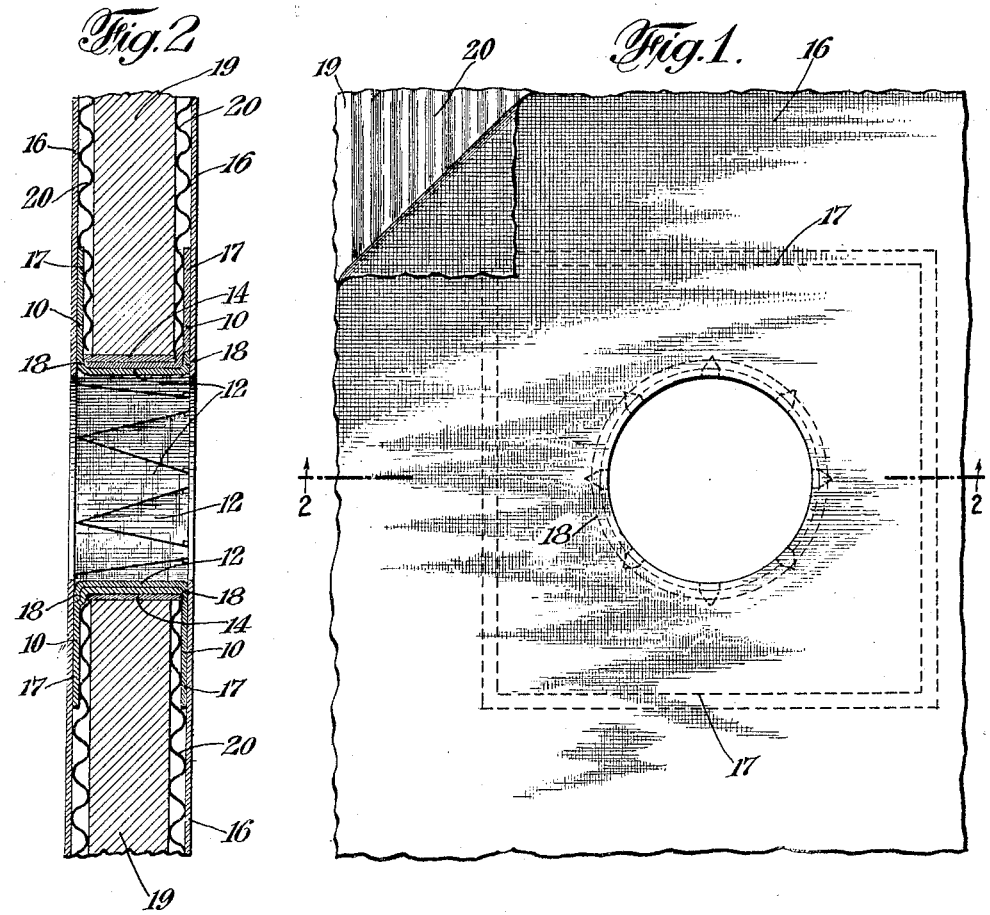
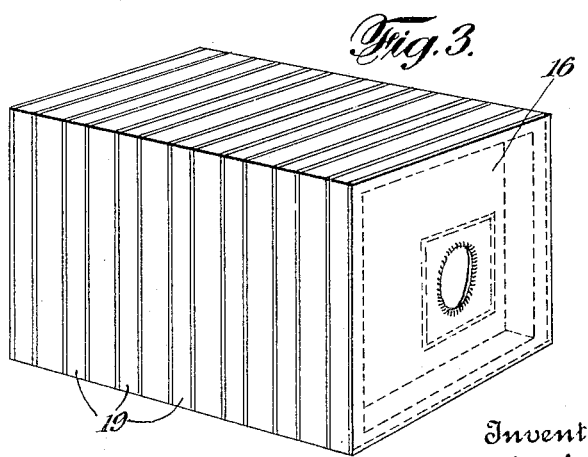
Inventor
Frank R. Furbish
By his Attorneys
Ward Crosby & Smith May 29, 1928. 1,671,187
F. R. FURBISH
FILTER PRESS CLOTH
Filed Nov. 13, 1925 3 Sheets-Sheet 2
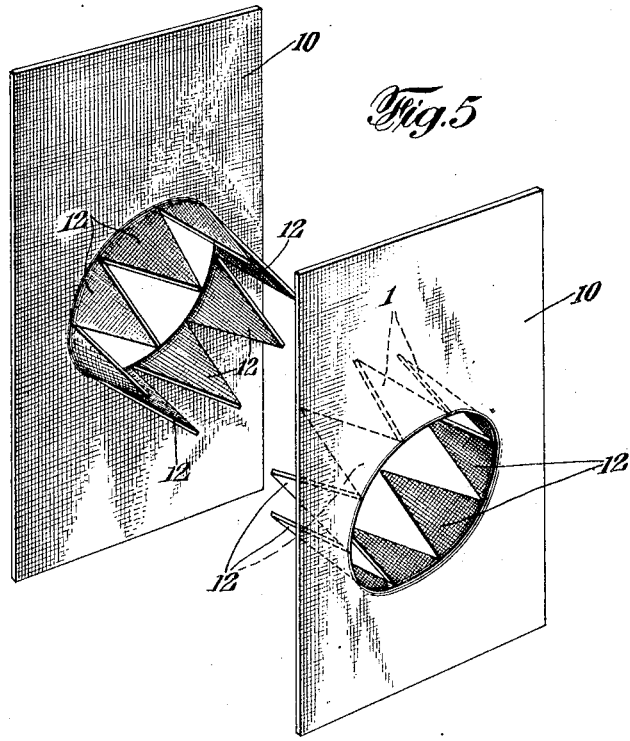
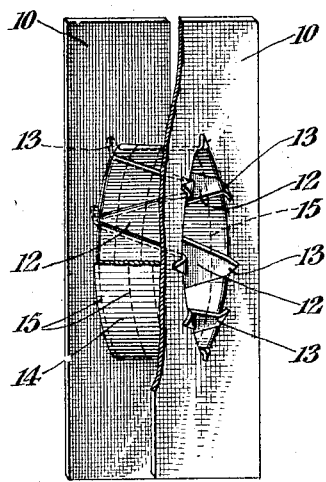
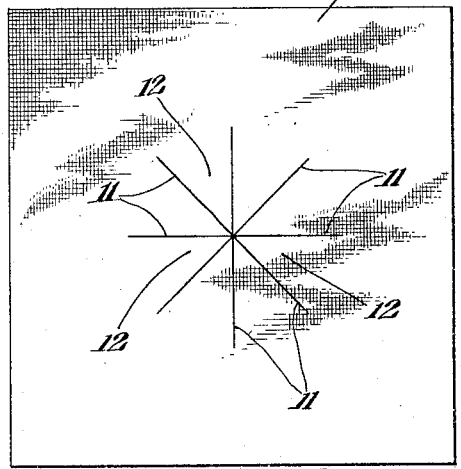
Inventor
Frank R. Furbish
By his Attorneys
Ward Crosby + Smith May 29, 1928.  1,671,187
F. R. FURBISH
FILTER PRESS CLOTH
Filed Nov. 13, 1925  3 Sheets-Sheet 3
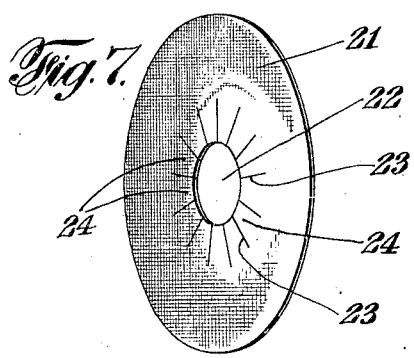
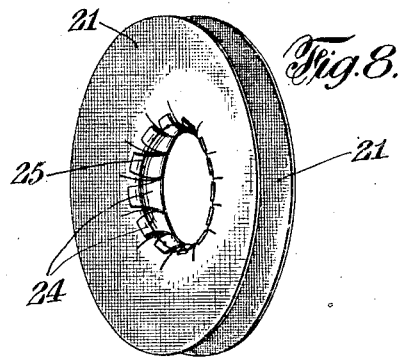
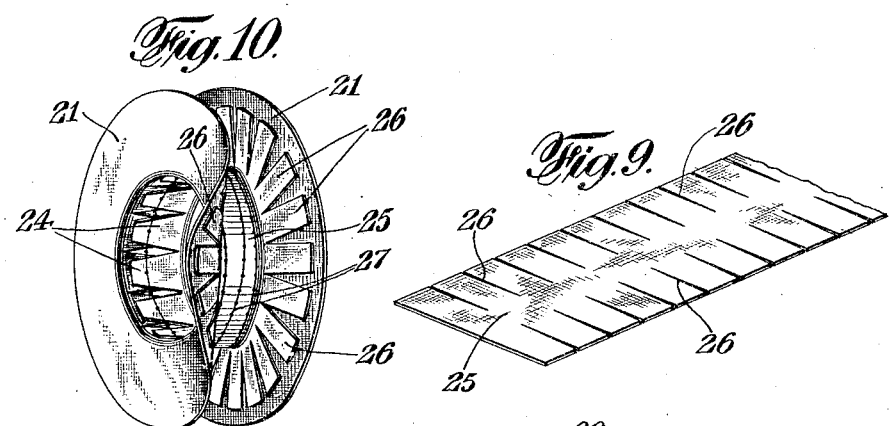
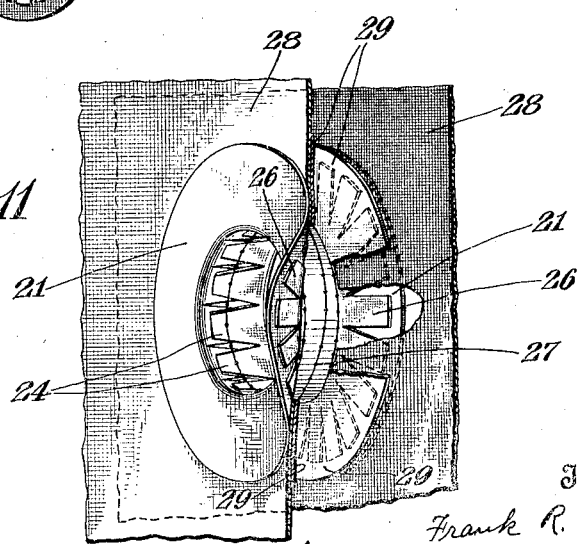

Patented May 29, 1928.

1,671,187

UNITED STATES PATENT OFFICE.

FRANK R. FURBISH, OF NEW YORK, N. Y., ASSIGNOR TO THE FILTER SACK MANUFACTURING CO., OF CLEVELAND, OHIO, A CORPORATION OF OHIO.

FILTER PRESS CLOTH.

Application filed November 13, 1925. Serial No. 68,778.

My invention relates to improvements in filter press cloths. The main object of the invention is to provide a filter press cloth or sack which is more easily inserted in place and better fits the filter press frames such as are commonly used in hydraulic filter presses. Other and more specific objects, features and advantages will more clearly appear from the detailed description given below taken in connection with the accompanying drawings which form a part of this specification.

In the drawings, Fig. 1 is a face view of a portion of a filter press frame or plate with a cloth embodying my invention in one form applied thereto.

Fig. 2 is a transverse section taken on the line 2—2 of Fig. 1.

Fig. 3 is a perspective showing a number of the filter press frames and cloths assembled together.

Fig. 4 is a plan view of a blank of cloth such as used in making a cloth embodying my invention in one form.

Fig. 5 is a perspective illustrating the method of forming two blanks such as shown in Fig. 4.

Fig. 6 is a perspective illustrating one method of assembling the cloth blanks shown in Fig. 5.

Fig. 7 is a perspective illustrating another form of similar blank.

Fig. 8 is a perspective illustrating the method of assembling two such blanks.

Fig. 9 is a perspective illustrating a blank for a band to be associated with parts shown in Fig. 8.

Fig. 10 is a perspective illustrating the band of Fig. 9 applied thereto, and

Fig. 11 is a perspective illustrating a portion of the completed cloth or sack utilizing the arrangement shown in Fig. 10.

Filter cloths or sacks used in hydraulic filter presses have been commonly made by taking two sheets of cloth and providing central apertures therein and then sewing them together adjacent the apertures. One side of the cloth device is then inserted through the corresponding aperture of a filter press plate, whereupon one side is adapted to lie against one side of the filter press plate and the other side is adapted to lie against the other side of the filter press plate in a manner well understood by those skilled in the art. Where the cloth, however, passes into and through the aperture of the plate, it is necessarily badly wrinkled because the filter press cloth is not formed to fit the peripheral wall of the aperture in the plate, the two pieces of cloth which form the filter cloth not being spaced apart at the point where they enter and pass through the aperture in the plate. Therefore, according to my invention I space the layers of cloth from one another at the apertures and connect them together with fabric adjacent said apertures. This may be done in several ways, some of which I will now proceed to describe.

Referring to Fig. 4, I first cut two blanks of cloth as there shown. As there shown, each blank 10 is square in shape and provided with radial cuts 11, forming V shaped flaps 12, which are bent at right angles as shown in Fig. 5 and caught together by stitches as at 13. Thereupon a band of cloth 14 is laid over the overlapped V shaped portions 12 as shown in Fig. 6. Part of the band 14 is broken away in Fig. 6 in order to more clearly illustrate the underlying portions. This band 14 extends entirely around the overlapping V shaped portions 12 and all are securely fastened together as by 3 rows of stitches 15. Thus the two layers of cloth 10 are each provided with an aperture therethrough for the passage of the material to be filtered, said layers being spaced from one another at said apertures and connected thereto with fabric adjacent the apertures as by means of the portions 12 and 14, which fabric extends at right angles to the parallel planes in which the layers of cloth 10 lie. Thereupon larger sheets of filter cloth 16 provided with corresponding central apertures are sewed to the outside faces of the layers 10 as shown in Figures 1 and 2, said outside layers 16 in the arrangement shown being sewed to the layers 10 at 17 and 18.

Referring to Figures 1 and 2, 19 represents a filter press plate provided with a corresponding central aperture, the plate 19 being provided with vertical grooves as at 20. The filter press cloth described is applied to plate 19 by forcing one-half thereof through the central aperture in the plate 19 and then arranging the two layers of cloth 10 and 16 in substantially parallel planes on opposite sides of the plate 19 and by reason of the fabric which connects the layers together but spaces them apart at the aperture, the arrangement very nicely fits the plate and there is no material wrinkling where the filter cloth passes into and through the aperture in the filter plate. This makes it much easier to properly adjust the filter cloth on the plate and produces a more efficient and satisfactory arrangement.

Referring to Figures 7 to 11 inclusive, I there show a modified arrangement for making up the spacing fabric and applying the same. As there shown two blanks, as shown at 21 in Fig. 7, are each provided with a central aperture as at 22 and radial cuts 23. Two of these blanks are then placed together as shown in Fig. 8 and the portions 24 between the radial slots are bent at right angles and sewed together as at 25. Thereupon a band of the same cloth is provided as illustrated in Fig. 9. This band 25' is provided with a central uncut portion and with cuts 26 whereby a series of flaps are provided along both edges of the band 25'. This band is then placed around the periphery of the apertures and between the members 21 as illustrated in Fig. 10 and firmly sewed in place as by stitches at 27. Thereupon two larger pieces of cloth 28 of the required size for the filter cloth and provided with corresponding central apertures are placed adjacent the members 21 on the inside thereof and firmly sewed thereto. If desired, rings of cloth 29 may also be sewed to the members 28 adjacent and around the apertures as indicated in Fig. 11 for the purpose of further reinforcing the device.

It will thus be seen that in this case also the layers 21 are provided with apertures and are spaced from one another at said apertures and connected together by means of fabric adjacent said apertures, the connecting fabric extending at right angles to the planes of the two layers of cloth and also that there are provided layers of cloth of larger dimensions but correspondingly apertured and secured to the first two layers of cloth respectively. The bands of cloth 14 and 27 which extend around the connecting cloth and are secured to the layers adjacent the periphery of the apertures make a very strong and satisfactory arrangement. It will be noted furthermore that the larger pieces of cloth 28 will not only be sewed to the smaller layers 21 respectively, but also to the bands 25' around the periphery of the aligned apertures in the layers 28 respectively.

While I have described my improvements in great detail and with respect to certain preferred forms thereof, I do not desire to be limited to such forms or details since many changes and modifications may be made and the improvements embodied in widely different forms without departing from the spirit and scope of the invention in its broader aspects. Hence, I desire to cover all modifications and forms coming within the language or scope of any one or more of the appended claims.

What I claim as new and desire to secure by Letters Patent is:

1. A filter cloth comprising two layers of cloth each having an aperture therethrough for passage of the material to be filtered, said layers being spaced from one another at said apertures and connected together with a reinforced fabric cylindrical member adjacent said apertures, said member being cut and formed to assume its cylindrical shape throughout its length substantially without wrinkling or stretching of the fabric.

2. A filter cloth having two layers of cloth adapted to lie in parallel planes, said layers being spaced from one another and having aligned apertures therethrough, and cloth extending at right angles to said planes around the periphery of said apertures and connected with said layers respectively adjacent the periphery of said apertures and layers of cloth of larger dimensions but correspondingly apertured, secured to said first two layers of cloth respectively.

3. A filter cloth having two layers of cloth adapted to lie in parallel planes said layers being spaced from one another and provided with aligned apertures, integral flaps of the cloth which formerly covered the space occupied by said apertures being cut and bent toward the opposite layers respectively and connected together so that the two layers are connected by cloth extending at right angles to said planes around the periphery of said apertures.

4. A filter cloth having two layers of cloth adapted to lie in parallel planes said layers being spaced from one another and provided with aligned apertures, integral portions of the cloth which formerly covered the space occupied by said apertures being bent toward the opposite layers respectively and connected together so that the two layers are connected by cloth extending at right angles to said planes around the periphery of said apertures and a band of cloth extending around said connecting cloth and secured to said layers adjacent the periphery of said apertures.

5. A filter cloth having two layers of cloth adapted to lie in parallel planes said layers being spaced from one another and provided with aligned apertures, integral portions of the cloth which formerly covered the space occupied by said apertures being bent toward the opposite layers respectively and connected together so that the two layers are connected by cloth extending at right angles to said planes around the periphery of said apertures, a band of cloth extending around said connecting cloth and secured to said layers adjacent the periphery of said apertures and layers of cloth of larger dimensions but correspondingly apertured, secured to said first two layers of cloth respectively.

6. A filter cloth construction having a plurality of layers of cloth adapted to lie in substantially parallel planes, at least some of said layers being spaced from one another and provided with substantially aligned apertures, integral flaps of the cloth from the apertured areas of certain of the respective layers being cut and bent to extend toward each other to form a tubular connection between the layers at said apertures.

7. A filter cloth construction having a plurality of layers of cloth adapted to lie in substantially parallel planes, at least some of said layers being spaced from one another and provided with substantially aligned apertures, integral flaps of the cloth from the apertured areas of adjacent layers being provided and secured in staggered relation and bent so as to overlap to form a closed and substantially cylindrical walled tubular connection between the layers at said apertures.

In testimony whereof I have signed my name to this specification.

FRANK R. FURBISH.